(12) United States Patent
Suzuki et al.

(10) Patent No.: US 11,505,640 B2
(45) Date of Patent: Nov. 22, 2022

(54) ALICYCLIC EPOXY COMPOUND PRODUCT

(71) Applicant: DAICEL CORPORATION, Osaka (JP)

(72) Inventors: Hirose Suzuki, Tokyo (JP); Yoshito Nakai, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 206 days.

(21) Appl. No.: 16/961,557

(22) PCT Filed: Jan. 8, 2019

(86) PCT No.: PCT/JP2019/000166
§ 371 (c)(1),
(2) Date: Jul. 10, 2020

(87) PCT Pub. No.: WO2019/138988
PCT Pub. Date: Jul. 18, 2019

(65) Prior Publication Data
US 2021/0189058 A1 Jun. 24, 2021

(30) Foreign Application Priority Data

Jan. 12, 2018 (JP) .............................. JP2018-003224
Nov. 20, 2018 (JP) .............................. JP2018-217675

(51) Int. Cl.
*C08G 59/24* (2006.01)
*C08L 63/00* (2006.01)
(Continued)

(52) U.S. Cl.
CPC .............. *C08G 59/24* (2013.01); *C08L 63/00* (2013.01); *C09D 163/00* (2013.01);
(Continued)

(58) Field of Classification Search
None
See application file for complete search history.

(56) References Cited

FOREIGN PATENT DOCUMENTS

| CN | 101671318 A | * | 3/2010 |
| JP | 2010-18538 A | | 1/2010 |

(Continued)

OTHER PUBLICATIONS

English translation of International Preliminary Report on Patentability and Written Opinion dated Jul. 23, 2020, in PCT/JP2019/000166 (Forms PCT/IB/338, PCT/IB/373, and PCT/ISA/237).

(Continued)

*Primary Examiner* — Randy P Gulakowski
*Assistant Examiner* — Ha S Nguyen
(74) *Attorney, Agent, or Firm* — Birch, Stewart, Kolasch & Birch, LLP

(57) ABSTRACT

Provided is an alicyclic epoxy compound product used in applications for forming a cured product excellent in heat resistance and transparency.

The alicyclic epoxy compound product according to an embodiment of the present invention includes 3,4-epoxycyclohexylmethyl(3,4-epoxy)cyclohexanecarboxylate, a purity of which is of not less than 98.5 wt. %, and each content of a compound represented by Formula (a) below, a compound represented by Formula (b) below, a compound represented by Formula (c) below, and a compound represented by Formula (d) below is not greater than 0.5 wt. %.

(Continued)

[Chem. 1]

(a)

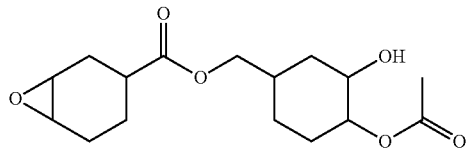

(b)

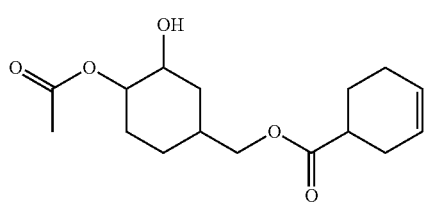

(c)

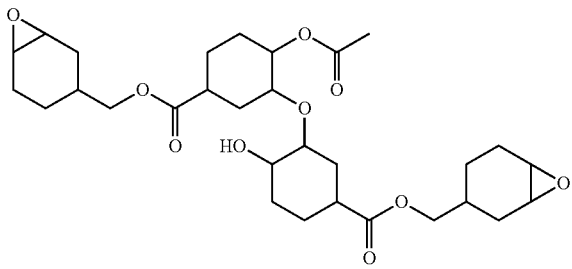

(d)

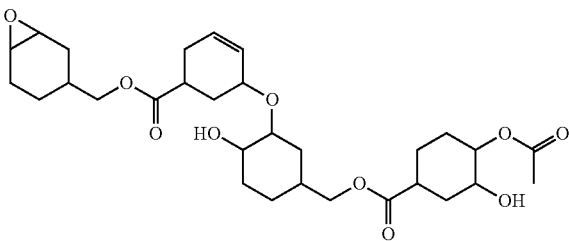

18 Claims, 1 Drawing Sheet

(51) Int. Cl.
*C09D 163/00* (2006.01)
*C09J 163/00* (2006.01)

(52) U.S. Cl.
CPC ..... *C08G 2150/00* (2013.01); *C08G 2170/00* (2013.01); *C08L 2201/08* (2013.01); *C08L 2201/10* (2013.01); *C08L 2203/206* (2013.01)

(56) References Cited

FOREIGN PATENT DOCUMENTS

JP  2010018538 A  * 1/2010
JP  2013-18921 A    1/2013

OTHER PUBLICATIONS

International Search Report dated Mar. 19, 2019, in PCT/JP2019/000166.

* cited by examiner

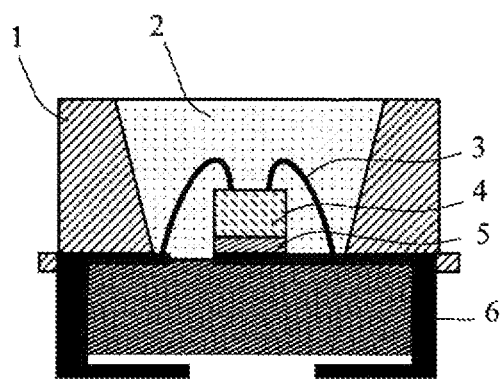

ALICYCLIC EPOXY COMPOUND PRODUCT

TECHNICAL FIELD

The present invention relates to a high-purity alicyclic epoxy compound product. The present application claims priority to JP 2018-003224 A filed in Japan on Jan. 12, 2018 and JP 2018-217675 A filed in Japan on Nov. 20, 2018, the contents of which are incorporated herein.

BACKGROUND ART

Optical semiconductor devices using an optical semiconductor element, such as a light-emitting diode (LED), as a light source are currently used in a variety of applications, such as various indoor or outdoor display boards, light sources for image capture, traffic signals, and large display units. Such an optical semiconductor device typically has a structure in which an optical semiconductor element is encapsulated with a resin (encapsulating resin). In addition, the encapsulating resin plays a role to protect the optical semiconductor element from moisture, an impact, and the like.

In recent years, development of optical semiconductor devices with higher power output and a shorter wavelength is in progress, and there is a problem of yellowing of the encapsulating resin due to heat generated from the optical semiconductor element, for example, in blue/white optical semiconductor devices. This is problematic because the yellowed encapsulating resin absorbs the light emitted from the optical semiconductor element, thus reducing the light intensity of the light output from the optical semiconductor device. Thus, a resin excellent in heat resistance and transparency is in demand.

On the other hand, 3,4-epoxycyclohexylmethyl(3,4-epoxy)cyclohexanecarboxylate is known to form a cured product excellent in transparency. However, a problem with this compound has been that a curable composition produced by adding a curing agent or a curing catalyst to an epoxy compound product containing 3,4-epoxycyclohexylmethyl (3,4-epoxy)cyclohexanecarboxylate as a main component does not provide sufficient heat resistance, and transparency is reduced by heat.

CITATION LIST

Patent Document

Patent Document 1: JP 2013-018921 A

SUMMARY OF INVENTION

Technical Problem

Thus, an object of the present invention is to provide an alicyclic epoxy compound product used in applications for forming a cured product excellent in heat resistance and transparency.

Another object of the present invention is to provide a method for producing the alicyclic epoxy compound product.

Still another object of the present invention is to provide an encapsulant, adhesive, or coating agent forming a cured product excellent in heat resistance and transparency.

Yet another object of the present invention is to provide an optical member including a cured product excellent in heat resistance and transparency.

In the present specification, the "product" means a form that can be industrially produced and can be distributed to the market and does not mean a chemical entity itself. In that sense, the "product" is a composition containing the target entity as a main component (in other words, containing the target entity nearly 100 wt. %).

Solution to Problem

As a result of diligent research to solve the problems described above, the present inventors found that specific byproducts formed during a production process of 3,4-epoxycyclohexylmethyl(3,4-epoxy)cyclohexanecarboxylate, if present at specific proportions in an alicyclic epoxy compound product containing 3,4-epoxycyclohexylmethyl (3,4-epoxy)cyclohexanecarboxylate as a main component, reduces the heat resistance and transparency of the resulting cured product, and preventing the formation of the specific byproducts and removing the specific byproducts can improve the heat resistance and transparency of the resulting cured product. On the other hand, a purification method of 3,4-epoxycyclohexylmethyl(3,4-epoxy)cyclohexanecarboxylate known in the art includes subjecting a reaction product of 3,4-epoxycyclohexylmethyl(3,4-epoxy)cyclohexanecarboxylate and an organic peracid to wash with water, and then distilling off a low-boiling point component, such as a solvent, using a thin film evaporator (i.e., subjecting to a treatment of removing a low-boiling fraction) to produce purified 3,4-epoxycyclohexylmethyl(3,4-epoxy)cyclohexanecarboxylate as a bottom liquid (e.g., JP 09-067356 A).

However, the present inventors discovered that the method fails to prevent the formation of the specific byproducts, which cause decreases in heat resistance and transparency. In addition, the present inventors found that a treatment of removing a low-boiling fraction followed by a treatment of removing a high-boiling fraction under specific distillation conditions can prevent the formation of the specific byproducts, and a 3,4-epoxycyclohexylmethyl(3,4-epoxy)cyclohexanecarboxylate product thus obtained can form a cured product excellent in heat resistance, transparency, and hue. The present invention was completed based on these findings.

That is, an embodiment of the present invention provides an alicyclic epoxy compound product, in which a purity of 3,4-epoxycyclohexylmethyl(3,4-epoxy)cyclohexanecarboxylate is not less than 98.5 wt. %, and each content of a compound represented by Formula (a) below, a compound represented by Formula (b) below, a compound represented by Formula (c) below, and a compound represented by Formula (d) below is not greater than 0.5 wt. %.

[Chem. 1]

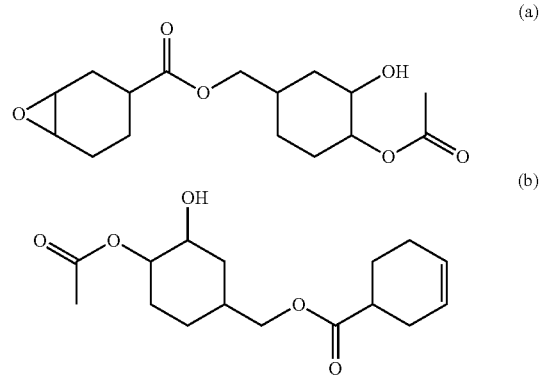

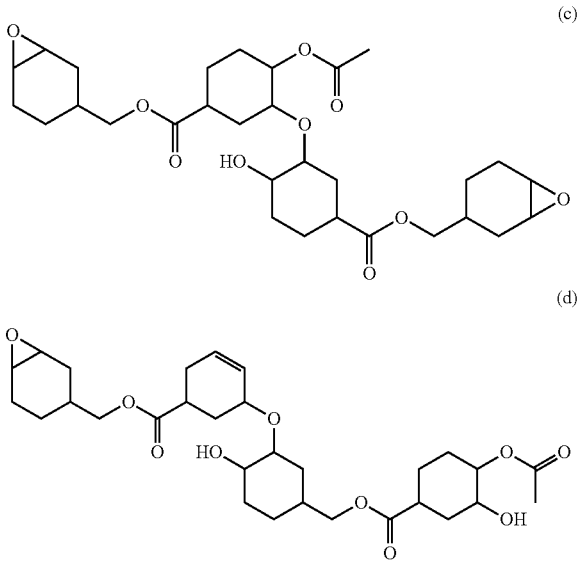

(c)

(d)

An embodiment of the present invention also provides the alicyclic epoxy compound product described above, in which a light transmittance of light at a wavelength of 450 nm is not lower than 86%, and a Hazen color number is not greater than 14.

An embodiment of the present invention also provides a method for producing an alicyclic epoxy compound product, the method including:

(1) reacting 3,4-cyclohexenylmethyl(3,4-cyclohexene) carboxylate with an organic peracid to react to obtain a reaction product;

(2) performing a treatment of removing a low-boiling fraction on the reaction product; and (3) performing a treatment of removing a high-boiling fraction on the reaction product using a distillation column having an actual number of plates of not less than 14 under a condition of a distillation temperature of not higher than 190° C.

An embodiment of the present invention also provides a curable composition containing the alicyclic epoxy compound product described above.

An embodiment of the present invention also provides the curable composition described above, further containing a curing agent (B) and a curing accelerator (C).

An embodiment of the present invention also provides the curable composition described above, further containing a curing catalyst (D).

An embodiment of the present invention also provides a cured product of the curable composition described above.

An embodiment of the present invention also provides an encapsulant containing the curable composition described above.

An embodiment of the present invention also provides an adhesive containing the curable composition described above.

An embodiment of the present invention also provides a coating agent containing the curable composition described above.

An embodiment of the present invention also provides an optical member including the curable composition described above.

Advantageous Effects of Invention

The alicyclic epoxy compound product according to an embodiment of the present invention has high purity and has a very low content of specific impurities (i.e., the compound represented by Formula (a), the compound represented by Formula (b), the compound represented by Formula (c), and the compound represented by Formula (d)). Thus, the alicyclic epoxy compound product according to an embodiment of the present invention can form a cured product excellent in heat resistance, transparency, and hue. Thus, the alicyclic epoxy compound product according to an embodiment of the present invention can be suitably used in industrial applications (e.g., such as encapsulants, adhesives, coating agents, or their raw materials).

BRIEF DESCRIPTION OF DRAWING

FIG. 1 is a schematic view (cross-sectional view) of an optical semiconductor device, which is an example of an optical member according to an embodiment of the present invention.

DESCRIPTION OF EMBODIMENTS

Alicyclic Epoxy Compound Product

An alicyclic epoxy compound product according to an embodiment of the present invention contains 3,4-epoxycyclohexylmethyl(3,4-epoxy)cyclohexanecarboxylate (i.e., a compound represented by Formula (i) below), and its purity (or content) is not less than 98.5 wt. %. That is, the alicyclic epoxy compound product according to an embodiment of the present invention is a high-purity 3,4-epoxycyclohexylmethyl(3,4-epoxy)cyclohexanecarboxylate. The purity (or content) of 3,4-epoxycyclohexylmethyl(3,4-epoxy)cyclohexanecarboxylate is preferably not less than 99.0 wt. % in terms of being able to provide a cured product particularly excellent in heat resistance and transparency.

[Chem. 2]

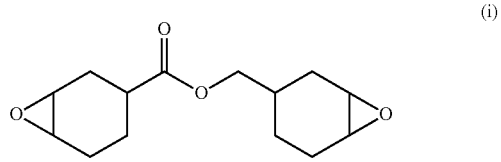

(i)

In addition, in the alicyclic epoxy compound product according to an embodiment of the present invention, each content of a compound represented by Formula (a) below, a compound represented by Formula (b) below, a compound represented by Formula (c) below, and a compound represented by Formula (d) below is not greater than 0.5 wt. %.

In the alicyclic epoxy compound product according to an embodiment of the present invention, more preferably the content of the compound represented by Formula (a) below is not greater than 0.4 wt. %, the content of the compound represented by Formula (b) below is not greater than 0.1 wt. %, the content of the compound represented by Formula (c) below is not greater than 0.5 wt. %, and the content of the compound represented by Formula (d) below is not greater than 0.3 wt. %.

[Chem. 3]

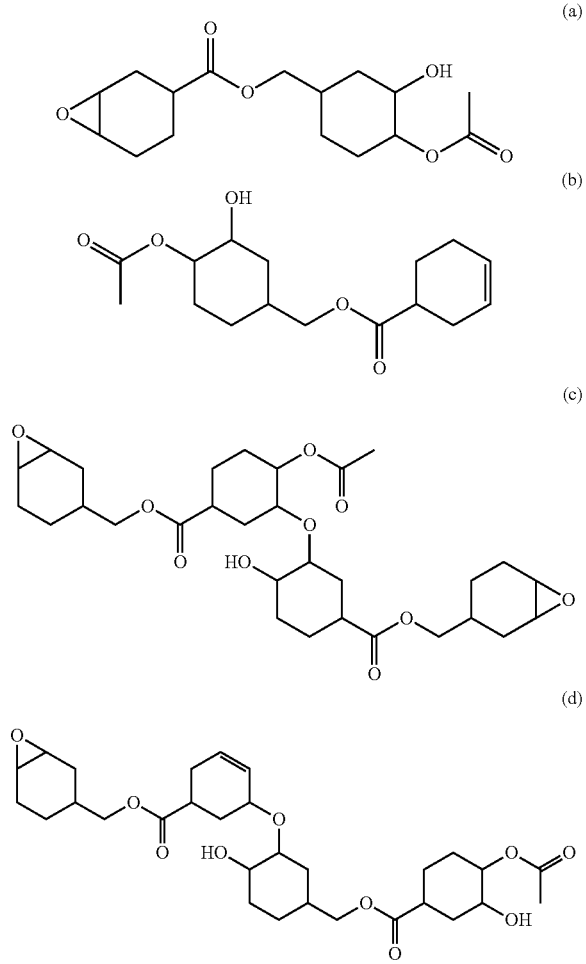

In addition, a total content of the compounds represented by Formulas (a) to (d) above in the alicyclic epoxy compound product according to an embodiment of the present invention is, for example, preferably not greater than 1.0 wt. %.

Furthermore, the alicyclic epoxy compound product according to an embodiment of the present invention has a content (total content) of, among impurities, in particular, a compound with a molecular weight of not greater than 100 and a compound with a molecular weight of not less than 270 (impurities including the compounds represented by Formulas (a) to (d) above) of preferably not greater than 1.5 wt. %, particularly preferably not greater than 1.3 wt. %, most preferably not greater than 1.2 wt. %, and especially preferably not greater than 1.0 wt. % in terms of providing a cured product particularly excellent in heat resistance and transparency.

As described above, the alicyclic epoxy compound product according to an embodiment of the present invention contains 3,4-cyclohexenylmethyl(3,4-cyclohexene)carboxylate in high purity, and each content of the compounds represented by Formulas (a) to (d) above is very low.

Thus, the alicyclic epoxy compound product according to an embodiment of the present invention is excellent in transparency, and a light transmittance at a wavelength of 450 nm of the alicyclic epoxy compound product (product thickness: 10 mm) according to an embodiment of the present invention is, for example, not less than 86% and preferably not less than 87% in a cell with an optical path length of 10 mm (10-mm square quartz cell).

In addition, the alicyclic epoxy compound product according to an embodiment of the present invention has a low degree of coloration, and a Hazen color number (APHA) is, for example, not greater than 14, preferably not greater than 13, particularly preferably not greater than 12, and most preferably not greater than 10.

A viscosity of the alicyclic epoxy compound product according to an embodiment of the present invention at 25° C. is, for example, from 50 to 1000 mPa·s, preferably from 100 to 500 mPa·s, even more preferably from 150 to 300 mPa·s, and particularly preferably from 200 to 300 mPa·s.

The viscosity in an embodiment of the present invention is measured using a digital viscometer (model No. "DVU-E II", available from Tokyo Keiki Inc.) under conditions: rotor: standard 1° 34'×R24; temperature: 25° C.; rotation number: from 0.5 to 10 rpm.

Method for Producing Alicyclic Epoxy Compound Product

The alicyclic epoxy compound product according to an embodiment of the present invention can be produced through the following. Either (2) or (3) may be performed before another.

(1) reacting 3,4-cyclohexenylmethyl(3,4-cyclohexene) carboxylate with an organic peracid to produce a reaction product (epoxidation);

(2) performing a treatment of removing a low-boiling fraction on the reaction product (removal of a low-boiling fraction); and (3) performing a treatment of removing a high-boiling fraction on the reaction product using a distillation column having an actual number of plates of not less than 14 under a condition of a distillation temperature of not higher than 190° C. (removal of a high-boiling fraction).

In addition, the method may include washing the resulting reaction product to remove the organic peracid used and its decomposition product (water washing) after performing (1) and before (2) (before (3) in performing in the order of (3) and (2)).

Epoxidation

The epoxidation is to react an organic peracid to with 3,4-cyclohexenylmethyl(3,4-cyclohexene)carboxylate represented by Formula (i') below to produce a reaction product. In this step, a reaction product containing 3,4-epoxy-cyclohexylmethyl (3,4-epoxy)cyclohexanecarboxylate represented by Formula (i) below is produced.

[Chem. 4]

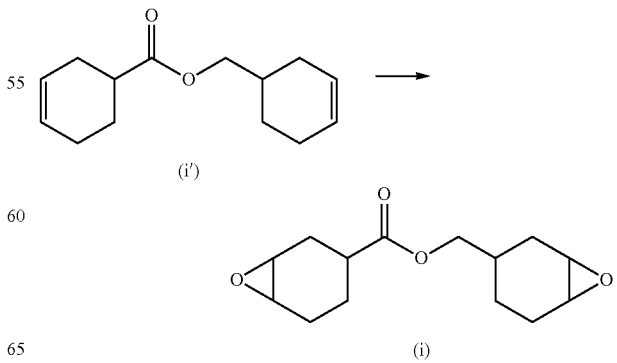

The organic peracid is preferably at least one selected from, for example, performic acid, peracetic acid, perpropionic acid, m-chloroperbenzoic acid, trifluoroperacetic acid, and perbenzoic acid.

An amount of the organic peracid to be used is, for example, from 0.5 to 3 mol relative to 1 mol of 3,4-cyclohexenylmethyl(3,4-cyclohexene)carboxylate.

The epoxidation reaction can be performed in the presence of a solvent. Examples of the solvent include aromatic hydrocarbons, such as benzene, toluene, xylene, ethylbenzene, isopropylbenzene, diethylbenzene, and p-cymene; alicyclic hydrocarbons such as cyclohexane, decalin, and the like; aliphatic hydrocarbons, such as n-hexane, heptane, octane, nonane, and decane; alcohols, such as cyclohexanol, hexanol, heptanol, octanol, nonanol, furfuryl alcohol; ketones, such as acetone, methyl ethyl ketone, and cyclohexanone; esters, such as ethyl acetate, n-amyl acetate, cyclohexyl acetate, isoamyl propionate, and methyl benzoate; polyhydric alcohols and their derivatives, such as ethylene glycol, propylene glycol, ethylene glycol monomethyl ether, ethylene glycol monomethyl ether acetate, ethylene glycol monoethyl ether, ethylene glycol monoethyl ether acetate, diethylene glycol monomethyl ether, and diethylene glycol monoethyl ether; halogen compounds, such as chloroform, dimethyl chloride, carbon tetrachloride, and chlorobenzene; and ethers, such as 1,2-dimethoxyethane. One of these solvents can be used alone or two or more in combination.

An amount of the solvent to be used is, for example, approximately from 0.2 to 10 times by weight of 3,4-cyclohexenylmethyl(3,4-cyclohexene)carboxylate.

In the epoxidation reaction, a stabilizer for the organic peracid (e.g., such as ammonium hydrogen phosphate, potassium pyrophosphate, or 2-ethylhexyl tripolyphosphate), a polymerization inhibitor (e.g., hydroquinone, piperidine, ethanolamine, or phenothiazine), or the like can also be used as necessary.

The reaction temperature of the epoxidation reaction is, for example, from 0 to 70° C. The reaction atmosphere is not particularly limited as long as it does not inhibit the reaction, and examples of the reaction atmosphere include an air atmosphere, a nitrogen atmosphere, and an argon atmosphere.

Water Washing

The water washing is to remove the organic peracid and its decomposition product, which is an organic acid, included in the reaction product obtained through the epoxidation, by water washing.

An amount of water to be used is, for example, approximately from 0.1 to 3 times (v/v) the reaction product. An equilibrium extractor, such as a mixer-settler type; an extraction column; a centrifugal extractor; or the like can be used for the water washing.

Removal of Low-Boiling Fraction

The removal of a low-boiling fraction is to distill off a component having a lower boiling point than that of 3,4-epoxycyclohexylmethyl(3,4-epoxy)cyclohexanecarboxylate, included in the reaction product (e.g., such as a solvent or moisture). The reaction product is subjected to this process, and a content of a compound with a molecular weight of not greater than 100 is reduced, where the compound is present in the alicyclic epoxy compound product, to a very low level.

A thin film evaporator or distillation column can be used for the distillation. The distillation is preferably performed under conditions of a heating temperature ranging from 50 to 200° C. and a pressure ranging from 1 to 760 torr. The distillation can also be performed in two or more stages under different pressure and temperature.

In subjecting the reaction product to the removal of a low-boiling fraction, a polymerization inhibitor is preferably added to prevent a ring-opening polymerization reaction of 3,4-epoxycyclohexylmethyl(3,4-epoxy)cyclohexanecarboxylate. An amount of the polymerization inhibitor to be added differs slightly depending on the type of the polymerization inhibitor and the distillation temperature but is preferably in a range of, for example, 1 to 10000 ppm (in particular, 10 to 2000 ppm) relative to the amount of the reaction product.

In the removal of a low-boiling fraction, a component having a lower boiling point than that of 3,4-epoxycyclohexylmethyl(3,4-epoxy)cyclohexanecarboxylate is evaporated and removed from the reaction product, and a mixture of 3,4-epoxycyclohexylmethyl(3,4-epoxy)cyclohexanecarboxylate and a component having a higher boiling point than that of 3,4-epoxycyclohexylmethyl(3,4-epoxy)cyclohexanecarboxylate is produced as a bottom liquid.

Removal of High-Boiling Fraction

The removal of a high-boiling fraction is to evaporate and distil 3,4-epoxycyclohexylmethyl(3,4-epoxy)cyclohexanecarboxylate from the mixture of 3,4-epoxycyclohexylmethyl(3,4-epoxy)cyclohexanecarboxylate and a component having a higher boiling point than that of 3,4-epoxycyclohexylmethyl(3,4-epoxy)cyclohexanecarboxylate, the mixture being the bottom liquid obtained through the removal of a low-boiling fraction. The mixture is subjected to this process, and a content of a compound with a molecular weight of not less than 270 can be reduced, where the compound includes the compounds represented by Formulas (a) to (d) above and is present in the alicyclic epoxy compound product, to a very low level.

It is preferred to introduce the bottom liquid into a distillation column, collect 3,4-epoxycyclohexylmethyl(3,4-epoxy)cyclohexanecarboxylate as a column top distillate, and discharge a column bottom liquid containing the high-boiling point component out of the system.

The treatment of removing a high-boiling fraction is preferably performed under conditions of a distillation temperature of not higher than 190° C. (preferably from 130 to 190° C. and particularly preferably from 140 to 190° C.).

The treatment of removing a high-boiling fraction is preferably performed under conditions of a column bottom temperature of the distillation column of not higher than 220° C. (preferably from 160 to 220° C., particularly preferably from 170 to 200° C., and most preferably from 170 to 190° C.).

The treatment of removing a high-boiling fraction is preferably performed at a column top temperature of the distillation column of not higher than 190° C. (preferably from 130 to 190° C. and particularly preferably from 140 to 170° C.).

The treatment of removing a high-boiling fraction is preferably performed under the conditions described above. This is because the treatment of removing a high-boiling fraction performed under the conditions described above provides effects of (1) to (4) below in combination and the alicyclic epoxy compound product that contains 3,4-epoxycyclohexylmethyl(3,4-epoxy)cyclohexanecarboxylate in high purity, has a light transmittance of light at a wavelength of 450 nm of not lower than 86% and a Hazen color number of not greater than 14, and can be suitably used in an application to form a cured product particularly excellent in heat resistance and transparency.

(1) Preventing an organic acid, which is a decomposition product of the organic peracid, from reacting with 3,4-epoxycyclohexylmethyl(3,4-epoxy)cyclohexanecarboxylate and producing the compound represented by Formula (a) as a byproduct;

(2) Preventing production of the compound represented by Formula (a) as a byproduct, thus preventing reduction in yield of 3,4-epoxycyclohexylmethyl(3,4-epoxy)cyclohexanecarboxylate;

(3) Preventing an organic acid, which is a decomposition product of the organic peracid, from reacting with the compound represented by Formula (a) produced as a byproduct and producing the compound represented by Formula (c) and the compound represented by Formula (d) as byproducts; and (4) Preventing an organic acid, a decomposition product of the organic peracid, from reacting with 3,4-cyclohexenylmethyl(3,4-cyclohexene)carboxylate that remains unreacted and producing the compound represented by Formula (b) as a byproduct.

In addition, a distillation column, such as, for example, a packed column or a plate column, can be used. The actual number of plates of the distillation column is, for example, not less than 14, and the actual number of plates is preferably from 14 to 100 and particularly preferably from 14 to 50 in terms of preventing the inclusion of the compounds represented by Formulas (a) to (d) into the product and achieving further improvement of the purity of the product.

The distillation is preferably performed under conditions of a heating temperature of not higher than 200° C. (preferably not higher than 160° C.) and a pressure of not higher than 10 torr (preferably not higher than 1 torr). This can prevent 3,4-epoxycyclohexylmethyl(3,4-epoxy)cyclohexanecarboxylate from decomposing, which increases the degree of coloration and prevent the epoxy group of 3,4-epoxycyclohexylmethyl(3,4-epoxy)cyclohexanecarboxylate from ring-opening polymerizing that promotes gelation.

The reflux ratio is, for example, within a range from 0.1 to 50.0 (preferably from 1 to 10) and not particularly limited, but the reflux ratio that is too high would tend to increase the energy cost, and in contrast, the reflux ratio that is too low would readily cause the compounds represented by Formulas (a) to (d) to be present in the product.

Curable Composition

A curable composition according to an embodiment of the present invention contains the alicyclic epoxy compound product described above.

The curable composition according to an embodiment of the present invention includes, as the curable compound (A), 3,4-epoxycyclohexylmethyl(3,4-epoxy)cyclohexanecarboxylate included in the alicyclic epoxy compound product described above but may contain one or two or more additional curable compounds in addition to 3,4-epoxycyclohexylmethyl(3,4-epoxy)cyclohexanecarboxylate. Examples of the additional curable compound include cationic polymerizable compounds, such as epoxy compounds other than 3,4-epoxycyclohexylmethyl(3,4-epoxy)cyclohexanecarboxylate, oxetane compounds, and vinyl ether compounds.

The epoxy compounds other than 3,4-epoxycyclohexylmethyl(3,4-epoxy)cyclohexanecarboxylate include alicyclic epoxy compounds, aromatic epoxy compounds, and aliphatic epoxy compounds.

In addition, the alicyclic epoxy compounds include the following compounds:

(1) a compound having an epoxy group (which may be referred to as an "alicyclic epoxy group" in the present specification, and the alicyclic epoxy group includes, for example, a cyclohexene oxide) composed of two adjacent carbon atoms and an oxygen atom that constitute an alicyclic ring in the molecule (excluding 3,4-epoxycyclohexylmethyl (3,4-epoxy)cyclohexanecarboxylate);

(2) a compound in which an epoxy group is directly bonded to an alicyclic ring by a single bond; and (3) a compound having an alicyclic ring and a glycidyl ether group in the molecule (a glycidyl ether epoxy compound).

Examples of the compound (1) having an alicyclic epoxy group include a compound represented by Formula (1) below:

[Chem. 5]

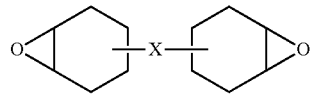

(1)

where X represents a single bond or a linking group.

In Formula (1) above, X represents a single bond or a linking group (a divalent group having one or more atoms). Examples of the linking group include a divalent hydrocarbon group, an epoxidized alkenylene group in which carbon-carbon double bonds are partially or entirely epoxidized, a carbonyl group, an ether bond, an ester bond, a carbonate group, an amide group, and a linked group in which a plurality of the above is linked. In Formula (1), a substituent (e.g., such as an alkyl group) may be bonded to a cyclohexene oxide group.

Examples of the divalent hydrocarbon group include a linear or branched alkylene group having from 1 to 18 carbon atoms and a divalent alicyclic hydrocarbon group. Examples of the linear or branched alkylene group having from 1 to 18 carbon atoms include a methylene group, a methylmethylene group, a dimethylmethylene group, an ethylene group, a propylene group, and a trimethylene group. Examples of the divalent alicyclic hydrocarbon group include a cycloalkylene group (including a cycloalkylidene group), such as a 1,2-cyclopentylene group, a 1,3-cyclopentylene group, a cyclopentylidene group, a 1,2-cyclohexylene group, a 1,3-cyclohexylene group, a 1,4-cyclohexylene group, and a cyclohexylidene group.

Examples of the alkenylene group in the epoxidized alkenylene group in which one, some, or all carbon-carbon double bond(s) is (are) epoxidized (which may be referred to as the "epoxidized alkenylene group") include a linear or branched alkenylene group having from 2 to 8 carbon atoms, such as a vinylene group, a propenylene group, a 1-butenylene group, a 2-butenylene group, a butadienylene group, a pentenylene group, a hexenylene group, a heptenylene group, and an octenylene group. In particular, the epoxidized alkenylene group is preferably an epoxidized alkenylene group in which all of the carbon-carbon double bond(s) is/are epoxidized and more preferably an epoxidized alkenylene group having from 2 to 4 carbon atoms in which all of the carbon-carbon double bond(s) is/are epoxidized.

Representative examples of the compound represented by Formula (1) above include (3,4,3',4'-diepoxy)bicyclohexyl, bis(3,4-epoxycyclohexylmethyl)ether, 1,2-epoxy-1,2-bis(3,4-epoxycyclohexane-1-yl)ethane, 2,2-bis(3,4-epoxycyclohexane-1-yl)propane, 1,2-bis(3,4-epoxycyclohexane-1-yl)ethane, and compounds represented by Formulas (1-1) to (1-7) below. L in Formula (1-4) below is an alkylene group having from 1 to 8 carbon atoms and is preferably, among these alkylene groups, a linear or branched alkylene group having from 1 to 3 carbon atoms, such as a methylene group, an ethylene group, a propylene group, or an isopropylene group. In Formulas (1-4) and (1-6) below, $n^1$ and $n^2$ each represent an integer from 1 to 30.

[Chem. 6]

(1-1)
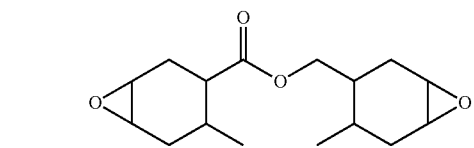

(1-2)
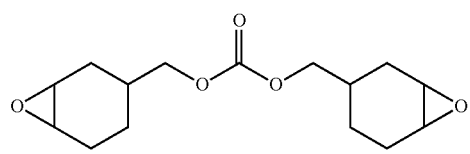

(1-3)
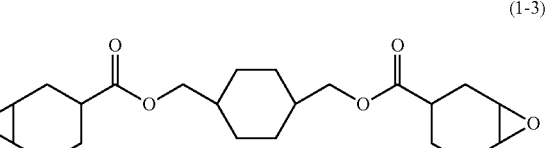

(1-4)
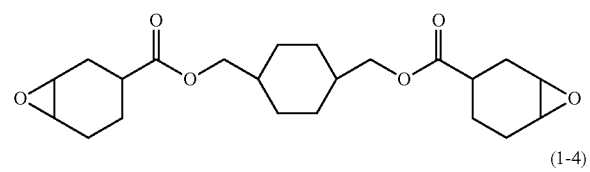

(1-5)
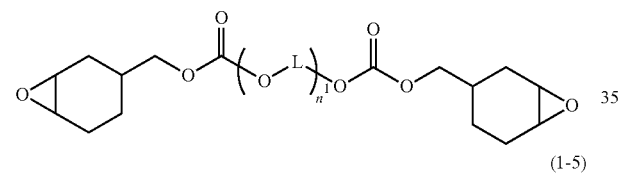

(1-6)
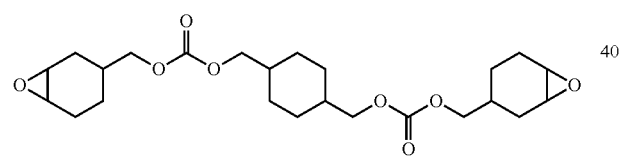

(1-7)
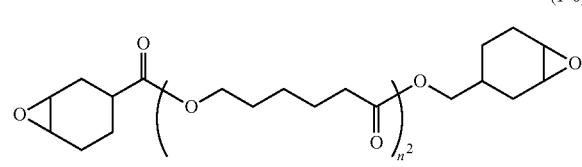

Examples of the compound (1) having the alicyclic epoxy group also includes, in addition to the compound represented by Formula (1) above, for example, compounds having three or more alicyclic epoxy groups in the molecule, represented by Formulas (1-8) and (1-9) below, or compounds having one alicyclic epoxy group in the molecule, represented by Formulas (1-10) to (1-12). In Formulas (1-8) and (1-9), $n^3$ to $n^8$ each represent an integer from 1 to 30.

[Chem. 7]

(1-8)
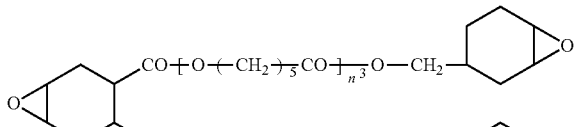

(1-9)
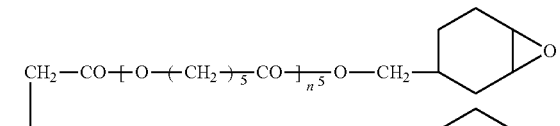
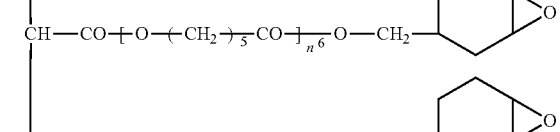
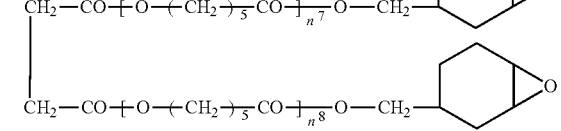

[Chem. 8]

(1-10)

(1-11)

(1-12)
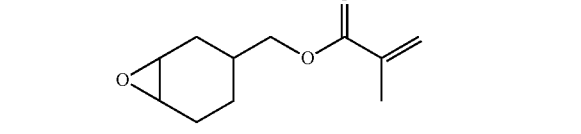

Examples of the compound (2) in which an epoxy group is directly bonded to an alicyclic ring by a single bond include a compound represented by Formula (2) below.

[Chem. 9]

(2)
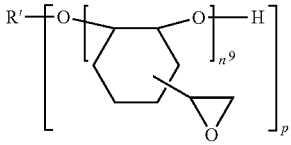

In Formula (2), R' is a group obtained by removing p hydroxy groups (—OH) from a structural formula of a p-hydric alcohol (i.e., R' is a p-valent organic group), and p and $n^9$ each represent a natural number. Examples of the p-hydric alcohol [R'(OH)$_p$] include polyhydric alcohols (such as polyhydric alcohols having from 1 to 15 carbon atoms), such as 2,2-bis(hydroxymethyl)-1-butanol. Here, p is preferably from 1 to 6, and $n^9$ is preferably from 1 to 30. When p is 2 or greater, $n^9$ in a group within each [ ] (within the outer square brackets) may be identical or different. Examples of the compound represented by Formula (2) above specifically include a 1,2-epoxy-4-(2-oxiranyl)cyclohexane adduct of 2,2-bis(hydroxymethyl)-1-butanol (e.g., such as "EHPE3150 (trade name)" (available from Daicel Corporation)).

Examples of the glycidyl ether epoxy compound (3) include glycidyl ethers of alicyclic alcohols (in particular, alicyclic polyhydric alcohols). More in particular, examples of the glycidyl ether epoxy compounds include a hydrogenated bisphenol A epoxy compound, a hydrogenated bisphenol F epoxy compound, a hydrogenated biphenol epoxy compound, a hydrogenated phenol novolac epoxy compound, and a hydrogenated cresol novolac epoxy compound.

Examples of the aromatic epoxy compounds include a bisphenol A epoxy compound, a bisphenol F epoxy compound, a biphenol epoxy compound, a phenol novolac epoxy compound, and a cresol novolac epoxy compound.

Examples of the aliphatic epoxy compounds include glycidyl ethers of q-hydric alcohols having no cyclic structure (q is a natural number); glycidyl esters of monovalent or polyvalent carboxylic acids (e.g., such as acetic acid, propionic acid, butyric acid, stearic acid, adipic acid, sebacic acid, maleic acid, or itaconic acid); epoxidized materials of fats and oils having a double bond, such as epoxidized linseed oil, epoxidized soybean oil, and epoxidized castor oil; and epoxidized materials of polyolefins (including polyalkadienes), such as epoxidized polybutadiene.

Examples of the oxetane compounds may include 3,3-bis(vinyloxymethyl)oxetane, 3-ethyl-3-hydroxymethyloxetane, 3-ethyl-3-(2-ethylhexyloxymethyl)oxetane, 3-ethyl-3-(hydroxymethyl)oxetane, 3-ethyl-3-[(phenoxy)methyl]oxetane, 3-ethyl-3-(hexyloxymethyl)oxetane, 3-ethyl-3-(chloromethyl)oxetane, 3,3-bis(chloromethyl)oxetane, 1,4-bis[(3-ethyl-3-oxetanylmethoxy)methyl]benzene, bis([1-ethyl(3-oxetanyl)]methyl)ether, 4,4'-bis[(3-ethyl-3-oxetanyl)methoxymethyl]bicyclohexyl, 4,4'-bis[(3-ethyl-3-oxetanyl)methoxymethyl]biphenyl, 1,4-bis[(3-ethyl-3-oxetanyl)methoxymethyl]cyclohexane, 1,4-bis([(3-ethyl-3-oxetanyl)methoxy]methyl]benzene, 3-ethyl-3([(3-ethyloxetan-3-yl)methoxy]methyl}oxetane, and xylylenebisoxetane.

Examples of the vinyl ether compounds include aryl vinyl ethers, such as phenyl vinyl ether; alkyl vinyl ethers, such as n-butyl vinyl ether and n-octyl vinyl ether; cycloalkyl vinyl ethers, such as cyclohexyl vinyl ether; vinyl ethers having a hydroxyl group, such as 2-hydroxyethyl vinyl ether, diethylene glycol monovinyl ether, and 2-hydroxybutyl vinyl ether; and polyfunctional vinyl ethers, such as hydroquinone divinyl ether, 1,4-butanediol divinyl ether, cyclohexane divinyl ether, cyclohexanedimethanol divinyl ether, ethylene glycol divinyl ether, diethylene glycol divinyl ether, and triethylene glycol divinyl ether.

A proportion of 3,4-epoxycyclohexylmethyl(3,4-epoxy)cyclohexanecarboxylate in a total amount (100 wt. %) of the curable compound (A) contained in the curable composition is, for example, not less than 50 wt. % (e.g., from 50 to 100 wt. %), preferably not less than 60 wt. %, particularly preferably not less than 70 wt. %, and most preferably not less than 80 wt. %.

The curable composition according to an embodiment of the present invention preferably contains, in addition to the curable compound (A), for example, a curing agent (B), a curing accelerator (C), or a curing catalyst (D).

A proportion of a total content of the curable compound (A), the curing agent (B), and the curing accelerator (C) in a total amount of the curable composition according to an embodiment of the present invention is, for example, not less than 60 wt. %, preferably not less than 70 wt. %, particularly preferably not less than 80 wt. %, most preferably not less than 90 wt. %, and especially preferably not less than 95 wt. %.

In addition, a proportion of a total content of the curable compound (A) and the curing catalyst (D) in the total amount of the curable composition according to an embodiment of the present invention is, for example, not less than 60 wt. %, preferably not less than 70 wt. %, particularly preferably not less than 80 wt. %, most preferably not less than 90 wt. %, and especially preferably not less than 95 wt. %.

Thus, a content of a compound other than the curable compound (A), the curing agent (B), the curing accelerator (C), and the curing catalyst (D) in the total amount of the curable composition according to an embodiment of the present invention is, for example, not greater than 50 wt. %, preferably not greater than 40 wt. %, particularly preferably not greater than 20 wt. %, and most preferably not greater than 5 wt. %.

Curing Agent (B)

Examples of the curing agent (B) that can be used include curing agents well-known or commonly used as curing agents for epoxy resins, such as acid anhydrides (acid anhydride-based curing agents), amines (amine-based curing agents), polyamide resins, imidazoles (imidazole-based curing agents), polymercaptans (polymercaptane-based curing agents), phenols (phenol-based curing agents), polycarboxylic acids, dicyandiamides, and organic acid hydrazides. One of these curing agents can be used alone or two or more in combination.

Examples of the acid anhydrides include methyltetrahydrophthalic anhydrides (such as 4-methyltetrahydrophthalic anhydride and 3-methyltetrahydrophthalic anhydride), methylhexahydrophthalic anhydride (such as 4-methylhexahydrophthalic anhydride and 3-methylhexahydrophthalic anhydride), dodecenyl succinic anhydride, methyl endomethylene tetrahydrophthalic anhydride, phthalic anhydride, maleic anhydride, tetrahydrophthalic anhydride, hexahydrophthalic anhydride, methylcyclohexene dicarboxylic anhydride, pyromellitic anhydride, trimellitic anhydride, benzophenone tetracarboxylic anhydride, nadic anhydride, methylnadic anhydride, hydrogenated methylnadic anhydride, 4-(4-methyl-3-pentenyl)tetrahydrophthalic anhydride, succinic anhydride, adipic anhydride, sebacic anhydride, dodecanedioic anhydride, methylcylohexene tetracarboxylic anhydride, vinyl ether-maleic anhydride copolymers, and alkyl styrene-maleic anhydride copolymers. Among these anhydrides, acid anhydrides that are liquid at 25° C. (e.g., such as methyltetrahydrophthalic anhydride, methylhexahydrophthalic anhydride, dodecenyl succinic anhydride, and methyl endomethylene tetrahydrophthalic anhydride) are preferred in terms of handleability.

Examples of the amines include aliphatic polyamines, such as ethylenediamine, diethylenetriamine, triethylenetetramine, tetraethylenepentamine, dipropylenediamine, diethylaminopropylamine, and polypropylenetriamine; alicyclic polyamines, such as menthenediamine, isophoronediamine, bis(4-amino-3-methyldicyclohexyl)methane, diaminodicyclohexylmethane, bis(aminomethyl)cyclohexane, N-aminoethyl piperazine, and 3,9-bis(3-aminopropyl)-3,4,8,10-tetraoxaspiro[5,5]undecane; mononuclear polyamines, such as m-phenylenediamine, p-phenylenediamine, tolylene-2,4-diamine, tolylene-2,6-diamine, mesitylene-2,4-diamine, 3,5-diethyltolylene-2,4-diamine, and 3,5-diethyltolylene-2,6-diamine; and aromatic polyamines, such as biphenylenediamine, 4,4-diaminodiphenylmethane, 2,5-naphtylenediamine, and 2,6-naphtylenediamine.

Examples of the polyamide resins include polyamide resins having either one of a primary amino group or a secondary amino group or both in the molecule.

Examples of the imidazoles include 2-methylimidazole, 2-ethyl-4-methylimidazole, 2-undecylimidazole, 2-heptadecylimidazole, 2-phenylimidazole, 1-benzyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-undecylimidazolium trimellitate, 1-cyanoethyl-2-phenylimidazolium trimellitate, 2-methylimidazolium isocyanurate, 2-phenylimidazolium isocyanurate, 2,4-diamino-6-[2-methylimidazolyl-(1)]-ethyl-s-triazine, and 2,4-diamino-6-[2-ethyl-4-methylimidazolyl-(1)]-ethyl-s-triazine.

Examples of the polymercaptans include liquid polymercaptans and polysulfide resins.

Examples of the phenols include aralkyl resins, such as novolac phenolic resins, novolac cresol resins, p-xylylene-modified phenolic resins, and p-xylylene/m-xylylene-modified phenolic resins; terpene-modified phenolic resins; dicyclopentadiene-modified phenolic resins, and triphenolpropane.

Examples of the polycarboxylic acids include adipic acid, sebacic acid, terephthalic acid, trimellitic acid, and carboxy group-containing polyester.

The curing agent (B) is preferably an acid anhydride (acid anhydride curing agent) in terms of heat resistance and transparency of the resulting cured product, and a commercially available product can be used, such as "RIKACID MH-700 (trade name)" and "RIKACID MH-700F (trade name)" (both available from New Japan Chemical Co., Ltd.), and "HN-5500 (trade name)" (available from Hitachi Chemical Co., Ltd.).

A content (an amount to be blended) of the curing agent (B) is preferably from 50 to 200 parts by weight and more preferably from 80 to 150 parts by weight per 100 parts by weight of a total amount of compounds having an epoxy group included in the curable composition. More specifically, an acid anhydride, when used as the curing agent (B), is preferably used in a proportion from 0.5 to 1.5 equivalents per equivalent of epoxy groups in all the compounds having an epoxy group included in the curable composition according to an embodiment of the present invention. Making the content of the curing agent (B) at not less than 50 parts by weight allows the curing reaction to sufficiently proceed and tends to improve toughness of the resulting cured product. On the other hand, making the content of the curing agent (B) at not greater than 200 parts by weight prevents discoloration, tending to provide a cured product excellent in hue.

Curing Accelerator (C)

The curable composition according to an embodiment of the present invention, when contains the curing agent (B), preferably further contains the curing accelerator (C). The curing accelerator (C) has an effect of accelerating the reaction rate when a compound having an epoxy group (oxiranyl group) reacts with the curing agent (B).

Examples of the curing accelerator (C) include 1,8-diazabicyclo[5.4.0]undecene-7 (DBU) or its salts (e.g., such as a phenol salt, an octylate salt, a p-toluene sulfonate salt, a formate salt, and a tetraphenylborate salt); 1,5-diazabicyclo[4.3.0]nonene-5 (DBN) or its salts (e.g., such as a phenol salt, an octylate salt, a p-toluene sulfonate salt, a formate salt, and a tetraphenylborate salt); tertiary amines, such as benzyldimethylamine, 2,4,6-tris(dimethylaminomethyl)phenol, and N,N-dimethylcyclohexylamine; imidazoles, such as 2-ethyl-4-methylimidazole and 1-cyanoethyl-2-ethyl-4-methylimidazole; phosphoric esters; phosphines, such as triphenylphosphine and tris(dimethoxy)phosphine; phosphonium compounds, such as tetraphenylphosphonium tetra(p-tolyl)borate; organometallic salts, such as zinc octylate, tin octylate, and zinc stearate; and metal chelates, such as aluminum acetylacetone complex. One of these compounds can be used alone or two or more in combination.

As the curing accelerator (C), a commercially available product can be used, such as, for example, "U-CAT SA 506 (trade name)", "U-CAT SA 102 (trade name)", "U-CAT 5003 (trade name)", "U-CAT 18X (trade name)", and "U-CAT 12XD (trade name)" (under development) (the above available from San-Apro Ltd.); "TPP-K (trade name)" and "TPP-MK (trade name)" (the above available from Hokko Chemical Industry Co., Ltd.); and "PX-4ET (trade name)" (available from Nippon Chemical Industrial Co., Ltd.).

A content (an amount to be blended) of the curing accelerator (C) is preferably from 0.01 to 5 parts by weight, more preferably from 0.02 to 3 parts by weight, and even more preferably from 0.03 to 3 parts by weight per 100 parts by weight of the curing agent (B). Making the content of the curing accelerator (C) at not less than 0.01 parts by weight readily provide a further efficient curing accelerating effect. On the other hand, making the content of the curing accelerator (C) at not greater than 5 parts by weight prevents discoloration, and readily provide a cured product excellent in hue.

Curing Catalyst (D)

The curable composition according to an embodiment of the present invention may contain the curing catalyst (D) in place of the curing agent (B). The curing catalyst (D) has a function to cure the curable composition by initiating and/or accelerating the curing reaction (polymerization reaction) of a cationic curable compound, such as 3,4-epoxycyclohexylmethyl(3,4-epoxy)cyclohexanecarboxylate. Examples of the curing catalyst (D) include cationic polymerization initiators (such as photocationic polymerization initiators and thermal cationic polymerization initiators), which initiate polymerization by generating cationic species upon, for example, light irradiation or heat treatment; Lewis acid-amine complexes; Bronsted acid salts; and imidazoles. One of these compounds can be used alone or two or more in combination.

Examples of the photocationic polymerization initiators include hexafluoroantimonate salts, pentafluorohydroxyantimonate salts, hexafluorophosphate salts, and hexafluoroalcenate salts, and more specifically include sulfonium salts (in particular, triarylsulfonium salts), such as triarylsulfonium hexafluorophosphate (e.g., such as p-phenylthiophenyl diphenylsulfonium hexafluorophosphate) and triarylsulfonium hexafluoroantimonate; iodonium salts, such as diaryliodonium hexafluorophosphate, diaryliodonium hexafluoroantimonate, bis(dodecylphenyl)iodonium tetrakis(pentafluorophenyl)borate, and iodonium [4-(4-methylphenyl-2-methylpropyl)phenyl]hexafluorophosphate; phosphonium salts, such as tetrafluorophosphonium hexafluorophosphate; and pyridinium salts, such as N-hexylpyridinium tetrafluoroborate. In addition, as the photocationic polymerization initiator, a commercially available product can be preferably used, such as, for example, "UVACURE1590 (trade name)" (available from Daicel-Cytec Co., Ltd.); "CD-1010 (trade name)", "CD-1011 (trade name)", and "CD-1012 (trade name)" (the above available from Sartomer USA); "Irgacure 264 (trade name)" (available from BASF); and "CIT-1682 (trade name)" (Nippon Soda Co., Ltd.).

Examples of the thermal cationic polymerization initiators include aryldiazonium salts, aryliodonium salts, arylsulfonium salts, and allene-ion complexes, and a commercially available product can be preferably used, such as, for example, "PP-33 (trade name)", "CP-66 (trade name)", and "CP-77 (trade name)" (the above available from Adeka Corporation); "FC-509 (trade name)" (available from 3M); "UVE1014 (trade name)" (available from G.E.); "SAN-AID SI-60L (trade name)", "SAN-AID SI-80L (trade name)", "SAN-AID SI-100L (trade name)", "SAN-AID SI-110L (trade name)", and "SAN-AID SI-150L (trade name)" (the above available from Sanshin Chemical Industry Co., Ltd.); and "CG-24-61 (trade name)" (available from BASF).

Examples of the Lewis acid-amine complexes include $BF_3$.n-hexylamine, $BF_3$.monoethylamine, $BF_3$.benzylamine, $BF_3$.diethylamine, $BF_3$.pyperidine, $BF_3$.triethylamine, $BF$ 3° aniline, $BF_4$.n-hexylamine, $BF_4$.monoethylamine, $BF_4$.benzylamine, $BF_4$.diethylamine, $BF_4$.pyperidine, $BF_4$.triethylamine, $BF_4$.aniline, $PF_5$.ethylamine, $PF_5$.isopropylamine, $PF_5$.butylamine, $PF_5$.laurylamine, $PF_5$.benzylamine, and $AsF_5$.laurylamine.

Examples of the Bronsted acid salts include aliphatic sulfonium salts, aromatic sulfonium salts, iodonium salts, and phosphonium salts.

Examples of the imidazoles include 2-methylimidazole, 2-ethyl-4-methylimidazole, 2-undecylimidazole, 2-heptadecylimidazole, 2-phenylimidazole, 1-benzyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-undecylimidazolium trimellitate, 1-cyanoethyl-2-phenylimidazolium trimellitate, 2-methylimidazolium isocyanurate, 2-phenylimidazolium isocyanurate, 2,4-diamino-6-[2-methylimidazolyl-(1)]-ethyl-s-triazine, and 2,4-diamino-6-[2-ethyl-4-methylimidazolyl-(1)]-ethyl-s-triazine.

A content (an amount to be blended) of the curing catalyst (D) is preferably from 0.01 to 5 parts by weight, more preferably from 0.02 to 4 parts by weight, and even more preferably from 0.03 to 3 parts by weight per 100 parts by weight of the cationic curable compound contained in the curable composition. Use of the curing catalyst (D) within the above range readily increase the curing rate of the curable composition and improve the heat resistance and transparency of the cured product in a well-balanced manner.

The curable composition according to an embodiment of the present invention may contain, in addition to the above, one or two or more additives as necessary. Examples of the additive include polyhydric alcohols, such as ethylene glycol, diethylene glycol, propylene glycol, and glycerin; antifoaming agents, leveling agents, silane coupling agents, surfactants, inorganic fillers, flame retardants, colorants, ion adsorbents, pigments, fluorescents, and release agents.

The curable composition according to an embodiment of the present invention can be prepared by stirring and mixing the components described above in a state where the components are heated as necessary. For the stirring and mixing, a well-known or commonly used stirring and mixing means can be used, for example, including a mixer of various types, such as a dissolver and a homogenizer; a kneader; a roll mill; a bead mill; and a rotation/revolution stirring apparatus. In addition, after the stirring and mixing, the mixture may be defoamed under vacuum.

A viscosity of the curable composition according to an embodiment of the present invention at 25° C. is, for example, from 100 to 50000 mPa·s, preferably from 200 to 45000 mPa·s, and particularly preferably from 300 to 40000 mPa·s. Controlling the viscosity at 25° C. to the above range readily improves workability during casting or coating and to be less likely to cause a fault originating from a casting defect or a coating defect in the cured product.

The curable composition according to an embodiment of the present invention has fast curing properties, and the curing time (or gel time) at 120° C. is not longer than 1750 seconds, preferably not longer than 1730 seconds, and more preferably not longer than 1700 seconds.

The heating temperature (curing temperature) during curing is preferably from 45 to 200° C., more preferably from 100 to 190° C., and even more preferably from 100 to 180° C. In addition, the heating time (or curing time) is preferably from 30 to 600 minutes and more preferably from 45 to 540 minutes. The heating temperature or the heating time below the range listed above would result in insufficient curing. Conversely, the heating temperature or the heating time exceeding the above range would cause decomposition of the resin component. Thus, both deviations are not preferred. Although the curing conditions depend on various conditions, the curing conditions can be appropriately adjusted, for example, by shortening the heating time when the heating temperature is increased, or increasing the heating time when the heating temperature is reduced.

Cured Product

The cured product according to an embodiment of the present invention is produced by curing the curable composition described above. The cured product according to an embodiment of the present invention is excellent in transparency and heat resistance.

The cured product is excellent in transparency, and a light transmittance (a thickness of 3 mm) of light at a wavelength of 400 nm is, for example, not lower than 75%, preferably not lower than 80%, and particularly preferably not lower than 90%. The curable composition according to an embodiment of the present invention forms a cured product excellent in transparency and thus, when used as an encapsulant, a die attach paste agent, or the like of an optical semiconductor element in an optical semiconductor device, further readily increase the light intensity emitted from the optical semiconductor device.

The cured product is excellent in heat resistance, and its glass transition temperature (Tg) is, for example, not lower than 170° C. and preferably not lower than 175° C.

In addition, the cured product is excellent in heat resistance and can maintain high light transmittance also in high temperature environments. For example, a sustenance ratio (determined by the equation below) of the light transmittance of 400 nm light after heating the cured product at 120° C. for 300 hours is, for example, not lower than 65%, preferably not lower than 80%, particularly preferably not lower than 85%, and most preferably not lower than 90%.

Sustenance ratio of light transmittance=(light transmittance of cured product after heating)/(light transmittance of cured product before heating)×100

The curable resin composition according to an embodiment of the present invention can be used in various applications, such as, for example, encapsulants, adhesives, coating agents, electrical insulation materials, laminated plates, inks, sealants, resists, composite materials, transparent substrates, transparent sheets, transparent films, optical elements, optical lenses, optical shaping, electronic paper, touch screens, solar cell substrates, optical waveguides, light guiding plates, and holographic memories.

Encapsulant

The encapsulant according to an embodiment of the present invention contains the curable composition described above. The encapsulant according to an embodiment of the present invention can be preferably used in an application of encapsulating an optical semiconductor (optical semiconductor element) in an optical semiconductor device. Use of the encapsulant according to an embodiment of the present invention can encapsulate an optical semiconductor element with a cured product (i.e., an encapsulating material) excellent in transparency and heat resistance.

A proportion of a content of the curable composition in a total amount of the encapsulant according to an embodiment of the present invention is, for example, not less than 50 wt. %, preferably not less than 60 wt. %, and particularly preferably not less than 70 wt. %. The encapsulant according to an embodiment of the present invention may consist of only the curable composition.

Adhesive

The adhesive according to an embodiment of the present invention contains the curable composition. The adhesive according to an embodiment of the present invention can be used in applications to adhere/fix a member or the like to an adherend, in particular, in various applications requiring excellent transparency and heat resistance, such as a die attach paste agent for adhering and fixing an optical semiconductor element to a metal electrode in an optical semiconductor device; a lens adhesive for fixing a lens of a camera or the like to an adherend or bonding lenses together; an optical film adhesive for fixing an optical film (e.g., such as a polarizer, a polarizer protective film, or a retardation films) to an adherend, bonding optical films together, or bonding an optical film with another film.

The adhesive according to an embodiment of the present invention can be preferably used particularly as a die attach paste agent (or a die bond agent). Use of the adhesive according to an embodiment of the present invention as a die attach paste agent provides an optical semiconductor device in which an optical semiconductor element is adhered to an electrode with a cured product excellent in transparency and heat resistance.

A proportion of a content of the curable composition in a total amount of the adhesive according to an embodiment of the present invention is, for example, not less than 50 wt. %, preferably not less than 60 wt. %, and particularly preferably not less than 70 wt. %. The adhesive according to an embodiment of the present invention may consist of only the curable composition.

Coating Agent

The coating agent according to an embodiment of the present invention contains the curable composition. The coating agent according to an embodiment of the present invention can be used particularly in various applications requiring excellent transparency and heat resistance.

A proportion of a content of the curable composition in a total amount of the coating agent according to an embodiment of the present invention is, for example, not less than 50 wt. %, preferably not less than 60 wt. %, and particularly preferably not less than 70 wt. %. The coating agent according to an embodiment of the present invention may consist of only the curable composition.

Optical Member

An optical member according to an embodiment of the present invention contains the cured product of the curable composition described above. Examples of the optical member includes an optical semiconductor device in which an optical semiconductor element is encapsulated with the cured product of the curable composition described above; an optical semiconductor device in which an optical semiconductor element is adhered to an electrode with the cured product of the curable composition described above; and an optical semiconductor device in which an optical semiconductor element is adhered to an electrode with the cured product of the curable composition described above, and the optical semiconductor element is encapsulated with the cured product of the curable composition described above. The optical member according to an embodiment of the present invention has a configuration in which an optical semiconductor element is encapsulated and adhered with the cured product of the curable composition described above and thus is excellent in heat resistance and has high light extraction efficiency.

The optical member according to an embodiment of the present invention is excellent in heat resistance and can maintain high light transmittance also in high temperature environments. For example, a sustenance ratio (determined by the equation below) of the light transmittance after heating the optical member at 120° C. for 300 hours is, for example, not lower than 70% and preferably not lower than 75%.

Sustenance ratio of light transmittance=(light transmittance of optical member after heating)/(light transmittance of optical member before heating)×100

EXAMPLES

Hereinafter, the present invention will be described more specifically with reference to examples, but the present invention is not limited by these examples.

Example 1

Epoxidation

To a 20-L jacketed SUS316 reactor equipped with a stirrer, 5000 g of 3,4-cyclohexenylmethyl(3,4-cyclohexene)carboxylate was charged, and then the temperature was raised to an internal temperature of 25° C. Then 13790 g of a 30% solution of peracetic acid in ethyl acetate was added dropwise over 6 hours, followed by aging for 3 hours. The internal temperature was maintained at 30° C. during the dropwise addition and aging. Thus, a reaction crude liquid containing 18790 g of 3,4-epoxycyclohexylmethyl(3,4-epoxy)cyclohexanecarboxylate was produced.

Water Washing

The resulting reaction crude liquid diluted 1.7 times with ethyl acetate was fed from a light liquid inlet of a centrifugal extractor and treated with a mixture of a water washing solution/a crude reaction solution with a volume ratio of 2, and a light liquid was obtained from a light liquid outlet at a rate of 968 g/min, and a heavy liquid from a heavy liquid outlet at a rate of 2191 g/min.

Removal of Low-Boiling Fraction

To a forced stirring thin film evaporator with a heat transfer area of 0.034 m$^2$, 100 parts by weight of the resulting light liquid was charged, an operating pressure was maintained at 1 mmHg and a heating temperature at 170° C., and 35 parts by weight of a bottom liquid was obtained from the column bottom.

Removal of High-Boiling Fraction

The bottom liquid discharged from the column bottom was charged at 100 parts by weight/hr to a 15th plate counted from the bottom in a distillation column for removing high-boiling substances, where the distillation column had a column diameter of 40 mm and included a perforated-plate column having an actual number of plates of 20, and a column top temperature was maintained at 150° C., a column bottom temperature at 180° C., a pressure at 0.1 mmHg, and a reflux ratio at 5. A distillate was thus distilled from the column top of the distillation column for removing high-boiling substances at 95 parts by weight/hr. In addition, a bottom liquid was discharged from the column bottom at 5 parts by weight/hr. The distillate from the column top was collected and designated as an alicyclic epoxy compound product 1.

Evaluation

A purity of 3,4-epoxycyclohexylmethyl(3,4-epoxy)cyclohexanecarboxylate, each content of the compound represented by Formula (a) (i.e., compound (a)), the compound represented by Formula (b) (i.e., compound (b)), the compound represented by Formula (c) (i.e., compound (c)), and the compound represented by Formula (d) (i.e., compound (d)), and a total content of a compound with a molecular weight of not greater than 100 and a compound with a molecular weight of not less than 270 in the alicyclic epoxy compound product 1 were measured using a gas chromatograph in the conditions below to calculate area % values, and these values were converted to values in wt. %. The molecular weight of the detected peak was analyzed by mass spectrometry.

Measurement Conditions

Measurement apparatus: "HP6890 (trade name)", available from Agilent

Column packing material: (5% phenyl)methylsiloxane

Column size: 15 m in length×0.53 mmϕ in inside diameter×1.5 μm in film thickness Column temperature: the temperature was increased from 100° C. at 10° C./min to 250° C. and maintained for 15 min Detector: FID In addition, a light transmittance of light at a wavelength of 450 nm of the alicyclic epoxy compound product 1 was measured using a spectrophotometer ("UV-2400 (trade name)", 10-mm square quartz cell, a thickness of 10 mm, available from Shimadzu Corporation).

Furthermore, a degree of coloration of the alicyclic epoxy compound product 1 was evaluated by determining a Hazen color number (APHA).

Still more, a viscosity of the alicyclic epoxy compound product 1 was 242 mPa·s at 25° C. as measured using a digital viscometer (model No. "DVU-E II" available from Tokyo Keiki Inc.) under conditions: rotor: standard 1° 34'×R24; temperature: 25° C.; rotation number: from 0.5 to 10 rpm.

Example 2

An alicyclic epoxy compound product 2 was produced in the same manner as in Example 1 with the exception that the bottom liquid from the column for removing low-boiling fractions was charged to a 13th plate counted from the bottom in a distillation column for removing high-boiling substances, where the distillation column had a column diameter of 40 mm and included a perforated-plate column having an actual number of plates of 18.

Example 3

An alicyclic epoxy compound product 3 was produced in the same manner as in Example 1 with the exception that the bottom liquid from the column for removing low-boiling fractions was charged to a 10th plate counted from the bottom in a distillation column for removing high-boiling substances, where the distillation column had a column diameter of 40 mm and included a perforated-plate column having an actual number of plates of 15.

Comparative Example 1

An alicyclic epoxy compound product 4 was produced in the same manner as in Example 1 with the exception that the bottom liquid from the column for removing low-boiling fractions was charged to an 8th plate counted from the bottom in a distillation column for removing high-boiling substances, where the distillation column had a column diameter of 40 mm and included a perforated-plate column having an actual number of plates of 13.

Comparative Example 2

An alicyclic epoxy compound product 5 was produced in the same manner as in Example 1 with the exception that the bottom liquid from the column for removing low-boiling fractions was charged to a 5th plate counted from the bottom in a distillation column for removing high-boiling substances, where the distillation column had a column diameter of 40 mm and included a perforated-plate column having an actual number of plates of 10.

Comparative Example 3

An alicyclic epoxy compound product 6 was produced in the same manner as in Example 1 with the exception that the bottom liquid from the column for removing low-boiling fractions was charged to a first plate counted from the bottom in a distillation column for removing high-boiling substances, where the distillation column had a column diameter of 40 mm and included a perforated-plate column having an actual number of plate of 1.

Comparative Example 4

An alicyclic epoxy compound product 7 was produced in the same manner as in Example 1 with the exception that the column top temperature of the distillation column for removing high-boiling substances was changed to 210° C. and the column bottom temperature was changed to 240° C.

The evaluation results of the alicyclic epoxy compound products produced in Examples and Comparative Examples are shown below.

TABLE 1

| | Alicyclic epoxy compound product No. | Purity of compound represented by Formula (i) (wt. %) | Content of compound (a) (wt. %) | Content of compound (b) (wt. %) | Content of compound (c) (wt. %) | Content of compound (d) (wt. %) | Total content of compounds having molecular weight of not greater than 100 and molecular weight of not less than 270 (wt. %) | Light transmittance of 450 nm light (%) | APHA |
|---|---|---|---|---|---|---|---|---|---|
| Example 1 | 1 | 99.6 | 0.10 | 0.02 | 0.12 | 0.06 | 0.4 | 87.9 | 8 |
| Example 2 | 2 | 99.1 | 0.23 | 0.02 | 0.28 | 0.17 | 0.9 | 87.4 | 10 |
| Example 3 | 3 | 98.7 | 0.33 | 0.02 | 0.39 | 0.24 | 1.3 | 86.6 | 10 |
| Comparative Example 1 | 4 | 98.3 | 0.43 | 0.02 | 0.51 | 0.32 | 1.7 | 85.9 | 15 |
| Comparative Example 2 | 5 | 97.6 | 0.60 | 0.02 | 0.72 | 0.46 | 2.4 | 85.1 | 15 |
| Comparative Example 3 | 6 | 95.9 | 1.03 | 0.02 | 1.23 | 0.80 | 4.1 | 83.5 | 20 |
| Comparative Example 4 | 7 | 92.3 | 1.93 | 0.02 | 2.31 | 1.52 | 7.7 | 81.2 | 28 |

Examples 4 to 9 and Comparative Examples 5 to 12

The components were blended according to formulations (unit: part by weight) shown in the tables below, stirred using a rotation/revolution stirring apparatus ("THINKY MIXER AR-250 (trade name)", available from Thinky Corporation), and further defoamed, and a curable composition was formed.

Evaluation of Curability

Curability of the resulting curable composition was measured using a gel time measurement apparatus ("No. 153 Gel Time Tester (Magnet Type) (trade name)", available from Yasuda Seiki Seisaku-sho, Ltd.). In Examples 4 to 6 and Comparative Examples 5 to 8, curability in heating at 120° C. was evaluated, and in Examples 7 to 9 and Comparative Examples 9 to 12, curability in heating at 80° C. was evaluated.

The curable epoxy resin composition was filled into a mold and heated in a resin curing oven at 120° C. for 5 hours to produce a cured product, and a glass transition temperature, transparency, and heat resistance of the resulting cured product were evaluated by the methods below.

Measurement of Glass Transition Temperature (Tg)

The glass transition temperature of the cured product was determined under the conditions below.

Sample: 4 mm in length×5 mm in width×10 mm in thickness

Measurement apparatus: thermomechanical measurement apparatus (TMA), "TMA/SS6000 (trade name)", available from Seiko Instruments Co., Ltd.

Measurement mode: compression (needle penetration), constant load measurement

Measurement temperature: from 25° C. to 300° C.

Rate of temperature increase: 5° C./min

Evaluation of Transparency

The light transmittance (thickness direction; % T) of light at a wavelength of 400 nm of the cured product (thickness: 3 mm) was measured using a spectrophotometer ("UV-2400 (trade name)", available from Shimadzu Corporation).

Evaluation of Heat Resistance

The heat resistance of the cured product was evaluated by subjecting the cured product to a heat treatment at 120° C. for 300 hours, calculating a retention ratio of the light transmittance from the equation below. This was used as an index of the heat resistance.

Retention ratio (%) of light transmittance=(light transmittance of cured product after heat treatment/light transmittance of cured product before heat treatment)×100

In addition, the resulting curable composition was cast into a lead frame (InGaN element, 3.5 mm×2.8 mm) of an optical semiconductor, then the curable composition was heated in an oven at 120° C. for 5 hours, and an optical semiconductor device in which an optical semiconductor element was encapsulated with a cured product of the curable composition was produced (see FIG. 1). Brightness and heat resistance of the resulting optical semiconductor devices were evaluated.

Evaluation of Brightness

The brightness (lumen: lm) of the optical semiconductor device was measured by measuring total luminous flux of the optical semiconductor device using a total luminous flux measurement apparatus ("Multispectral Radiation Measurement System OL771 (trade name)", available from Optronic Laboratories).

Evaluation of Heat Resistance

The heat resistance of the optical semiconductor device was evaluated by subjecting the optical semiconductor device to a heat treatment at 120° C. for 300 hours, calculating a retention ratio of the light transmittance from the equation below. This was used as an index of the heat resistance.

Retention ratio (%) of light transmittance=(light transmittance of optical semiconductor device after heat treatment/light transmittance of optical semiconductor device before heat treatment)×100

TABLE 2

|  |  | Example 4 | Example 5 | Example 6 | Comparative Example 5 | Comparative Example 6 | Comparative Example 7 | Comparative Example 8 |
|---|---|---|---|---|---|---|---|---|
| Curable composition | Alicyclic epoxy compound product 1 | 100 | — | — | — | — | — | — |
|  | Alicyclic epoxy compound product 2 | — | 100 | — | — | — | — | — |
|  | Alicyclic epoxy compound product 3 | — | — | 100 | — | — | — | — |
|  | Alicyclic epoxy compound product 4 | — | — | — | 100 | — | — | — |
|  | Alicyclic epoxy compound product 5 | — | — | — | — | 100 | — | — |
|  | Alicyclic epoxy compound product 6 | — | — | — | — | — | 100 | — |
|  | Alicyclic epoxy compound product 7 | — | — | — | — | — | — | 100 |
|  | MH-700 | 100 | 100 | 100 | 100 | 100 | 100 | 100 |
|  | 18X | 0.5 | 0.5 | 0.5 | 0.5 | 0.5 | 0.5 | 0.5 |
|  | Ethylene glycol | 1 | 1 | 1 | 1 | 1 | 1 | 1 |
| Evaluation of curability | Curing time (sec) | 1688 | 1712 | 1734 | 1785 | 1821 | 1859 | 1954 |
| Evaluation of cured product | Tg (° C.) | 175 | 174 | 171 | 169 | 168 | 166 | 152 |
|  | Transparency (% T) | 91.1 | 90.8 | 90.4 | 89.8 | 89.4 | 89 | 85 |
|  | Heat resistance (%) | 92 | 91 | 88 | 83 | 80 | 78 | 75 |
| Evaluation of optical material (optical semiconductor device) | Brightness (lm) | 0.74 | 0.73 | 0.72 | 0.69 | 0.68 | 0.66 | 0.54 |
|  | Heat resistance (%) | 83 | 80 | 79 | 78 | 74 | 73 | 68 |

TABLE 3

|  |  | Example 7 | Example 8 | Example 9 | Comparative Example 9 | Comparative Example 10 | Comparative Example 11 | Comparative Example 12 |
|---|---|---|---|---|---|---|---|---|
| Curable composition | Alicyclic epoxy compound product 1 | 100 | — | — | — | — | — | — |
|  | Alicyclic epoxy compound product 2 | — | 100 | — | — | — | — | — |
|  | Alicyclic epoxy compound product 3 | — | — | 100 | — | — | — | — |
|  | Alicyclic epoxy compound product 4 | — | — | — | 100 | — | — | — |
|  | Alicyclic epoxy compound product 5 | — | — | — | — | 100 | — | — |
|  | Alicyclic epoxy compound product 6 | — | — | — | — | — | 100 | — |
|  | Alicyclic epoxy compound product 7 | — | — | — | — | — | — | 100 |
|  | SI-100L | 0.5 | 0.5 | 0.5 | 0.5 | 0.5 | 0.5 | 0.5 |
| Evaluation of curability | Curing time (sec) | 1245 | 1256 | 1286 | 1305 | 1337 | 1376 | 1450 |
| Evaluation of cured product | Tg (° C.) | 194 | 192 | 192 | 189 | 187 | 183 | 171 |
|  | Transparency (% T) | 78 | 78 | 76 | 74 | 74 | 71 | 64 |
|  | Heat resistance (%) | 68 | 67 | 65 | 63 | 60 | 58 | 54 |
| Evaluation of optical material (optical semiconductor device) | Brightness (lm) | 0.69 | 0.68 | 0.67 | 0.64 | 0.63 | 0.61 | 0.56 |
|  | Heat resistance (%) | 78 | 76 | 75 | 74 | 71 | 68 | 65 |

Abbreviations in the tables are described below.

MH700: curing agent, 4-methylhexahydrophthalic anhydride/hexahydrophthalic anhydride=70/30, "RIKACID MH-700 (trade name)", available from New Japan Chemical Co., Ltd.

18X: curing accelerator, special amine, "U-CAT 18X (trade name)", available from San-Apro Ltd.

SI-100L: curing catalyst (thermal cationic polymerization initiator), "SAN-AID SI-100L (trade name)", available from Sanshin Chemical Industry Co., Ltd.

To summarize the above, configurations and variations according to an embodiment of the present invention will be described below.

(1) An alicyclic epoxy compound product, wherein a purity of 3,4-epoxycyclohexylmethyl(3,4-epoxy)cyclohexanecarboxylate is not less than 98.5 wt. %, and each content of a compound represented by Formula (a), a compound represented by Formula (b), a compound represented by Formula (c), and a compound represented by Formula (d) is not greater than 0.5 wt. %.

(2) An alicyclic epoxy compound product, wherein a purity of 3,4-epoxycyclohexylmethyl(3,4-epoxy)cyclohexanecarboxylate is not less than 98.5 wt. %, and a content of a compound represented by Formula (a) is not greater than 0.4 wt. %, a content of a compound represented by Formula (b) is not greater than 0.1 wt. %, a content of a compound represented by Formula (c) is not greater than 0.5 wt. %, and a content of a compound represented by Formula (d) is not greater than 0.3 wt. %.

(3) The alicyclic epoxy compound product according to (1) or (2), a total content of the compound represented by Formula (a), the compound represented by Formula (b), the compound represented by Formula (c), and the compound represented by Formula (d) is not greater than 1.0 wt. %.

(4) The alicyclic epoxy compound product according to any one of (1) to (3), wherein a total content of a compound with a molecular weight of not greater than 100 and a compound with a molecular weight of not less than 270 is not greater than 1.5 wt. % (preferably not greater than 1.3 wt. %, particularly preferably not greater than 1.2 wt. %, and most preferably not greater than 1.0 wt. %).

(5) The alicyclic epoxy compound product according to any one of (1) to (4), wherein a light transmittance of light at a wavelength of 450 nm is not lower than 86%.

(6) The alicyclic epoxy compound product according to any one of (1) to (4), wherein a Hazen color number is not greater than 14.

(7) The alicyclic epoxy compound product according to any one of (1) to (4), wherein a light transmittance of light at a wavelength of 450 nm is not lower than 86%, and a Hazen color number is not greater than 14.

(8) The alicyclic epoxy compound product according to any one of (1) to (7), wherein a viscosity at 25° C. is from 50 to 1000 mPa·s (preferably from 100 to 500 mPa·s, more preferably from 150 to 300 mPa·s, and particularly preferably from 200 to 300 mPa·s).

(9) A method for producing an alicyclic epoxy compound product described in any one of (1) to (8), the method including:
<1> reacting 3,4-cyclohexenylmethyl(3,4-cyclohexene)carboxylate with an organic peracid to produce a reaction product;
<2> performing a treatment of removing a low-boiling fraction on the reaction product; and
<3> performing a treatment of removing a high-boiling fraction on the reaction product using a distillation column having an actual number of plates of not less than 14 under a condition of a distillation temperature of not higher than 190° C.

(10) The method for producing an alicyclic epoxy compound product according to (9), wherein the treatment of removing a high-boiling fraction in <3> is performed under a condition of a column bottom temperature of the distillation column of not higher than 220° C. (preferably from 160 to 220° C., particularly preferably from 170 to 200° C., and most preferably from 170 to 190° C.).

(11) The method for producing an alicyclic epoxy compound product according to (9) or (10), wherein the treatment of removing a high-boiling fraction in <3> is performed under a condition of a column top temperature of the distillation column of not higher than 190° C. (preferably from 130 to 190° C. and particularly preferably from 140 to 170° C.).

(12) The method for producing an alicyclic epoxy compound product according to any one of (9) to (11), wherein a reflux ratio is within a range of 0.1 to 50.0 (preferably 1 to 10).

(13) A curable composition containing the alicyclic epoxy compound product described in any one of (1) to (8).

(14) The curable composition according to (13), further containing a curing agent (B) and a curing accelerator (C).

(15) The curable composition according to (13), further containing a curing catalyst (D).

(16) A cured product of the curable composition described in any one of (13) to (15).

(17) An encapsulant containing the curable composition described in any one of (13) to (15).

(18) An adhesive containing the curable composition described in any one of (13) to (15).

(19) A coating agent containing the curable composition described in any one of (13) to (15).

(20) An optical member including the cured product described in (16).

INDUSTRIAL APPLICABILITY

The alicyclic epoxy compound product according to an embodiment of the present invention can be suitably used in industrial applications (e.g., such as encapsulants, adhesives, coating agents, or their raw materials).

REFERENCE SIGNS LIST

1 Reflector
2 Encapsulating material of optical semiconductor element
3 Bonding wire
4 Optical semiconductor element
5 Die bonding material
6 Metal wiring

The invention claimed is:
1. An alicyclic epoxy compound product, wherein a purity of A curable composition comprising: equal to and
not less than 98.7 wt. % of 3,4-epoxycyclohexylmethyl (3,4 epoxy)cyclohexanecarboxylate, and
at least one compound represented by Formula (a), (b), (c) or (d);
wherein each content of the compound represented by Formula (a), the compound represented by Formula (b), the compound represented by Formula (c), and the compound represented by Formula (d) is not greater than 0.5 wt. %; and wherein a total content of a compound with a molecular weight of not greater than 100 and a compound with a molecular weight of not less than 270, is equal to and not greater than 1.3 wt. %;

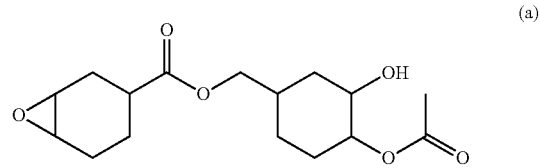

(a)

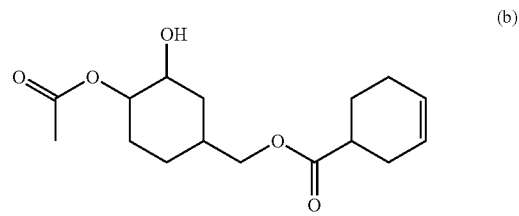

(b)

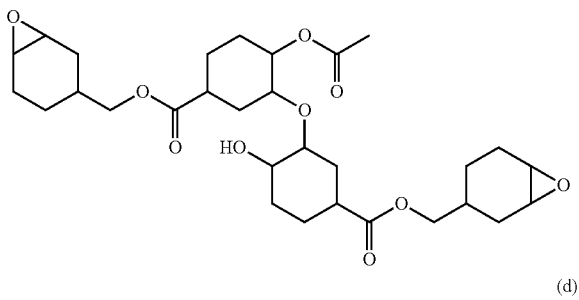

(c)

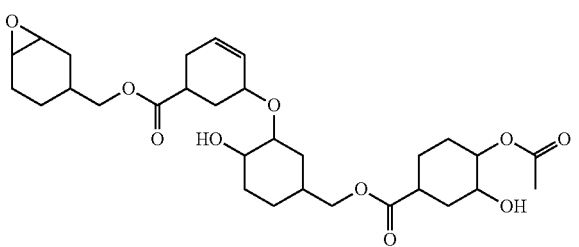

(d)

2. The curable composition according to claim 1, wherein a light transmittance of light at a wavelength of 450 nm is not lower than 86%, and a Hazen color number is not greater than 14.

3. A method for producing the curable composition according to claim 1, the method comprising:
   (1) reacting 3,4-cyclohexenylmethyl(3,4-cyclohexene) carboxylate with an organic peracid to produce a reaction product;
   (2) performing a treatment of removing a low-boiling fraction on the reaction product; and
   (3) performing a treatment of removing a high-boiling fraction on the reaction product using a distillation column having an actual number of plates of not less than 14 under a condition of a distillation temperature of not higher than 190° C.

4. The curable composition according to claim 1, further comprising a curing agent (B) and a curing accelerator (C).

5. The curable composition according to claim 1, further comprising a curing catalyst (D).

6. A cured product of the curable composition according to claim 1.

7. An encapsulant comprising the curable composition according to claim 1.

8. An adhesive comprising the curable composition according to claim 1.

9. A coating agent comprising the curable composition according to claim 1.

10. An optical member comprising the cured product according to claim 6.

11. The curable composition according to claim 1, wherein a total content of the compound represented by Formula (a), the compound represented by Formula (b), the compound represented by Formula (c), and the compound represented by Formula (d), is not greater than 1.0 wt. %.

12. The curable composition according to claim 1, wherein a viscosity at 25° C. is from 150 to 300 mPa·s.

13. The method for producing the curable composition according to claim 3, wherein the treatment of removing a high-boiling fraction in <3> is performed under a condition of a column bottom temperature of the distillation column from 170 to 220° C.

14. The method for producing the curable composition according to claim 3, wherein the treatment of removing a high-boiling fraction in <3> is performed under a condition of a column top temperature of the distillation column from 130 to 170° C.

15. The method for producing the curable composition according to claim 3,
   wherein <3> is a step for collecting 3,4-epoxycyclohexylmethyl(3,4-epoxy)cyclohexanecarboxylate as a column top distillate, while preventing producing the compound represented by Formula(a), the compound represented by Formula(b), the compound represented by Formula(c), and the compound represented by Formula(d) as a byproduct, by performing the treatment of removing a high-boiling fraction under the conditions of a column bottom temperature of the distillation column from 170 to 220° C., and a column top temperature of the distillation column from 130 to 170° C.

16. A method for producing an encapsulant, wherein the method comprises encapsulating an optical semiconductor with the curable composition according to claim 1.

17. An adhesive composition comprising not less than 60 wt % of the curable composition according to claim 1.

18. A coating agent comprising not less than 70 wt % of the curable composition according to claim 1.

* * * * *